(No Model.)
W. J. EDWARDS.
VELOCIPEDE.
No. 475,207. Patented May 17, 1892.
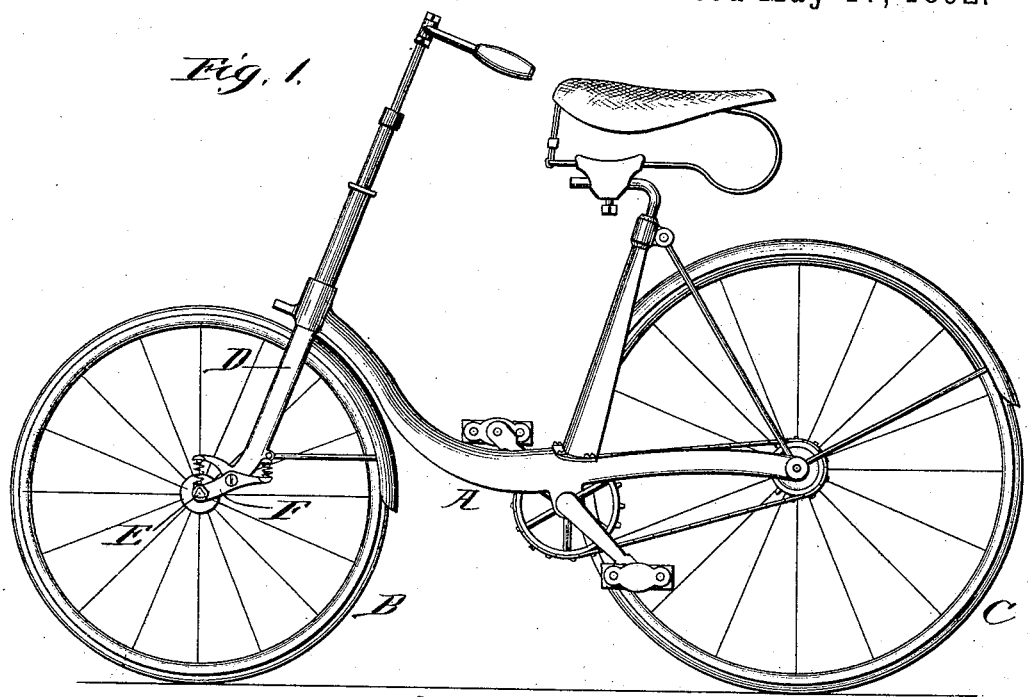
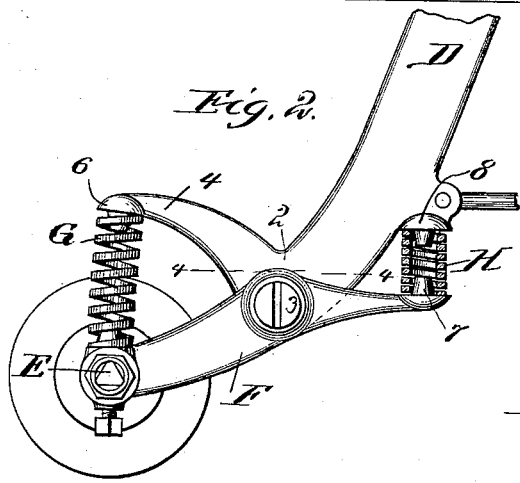
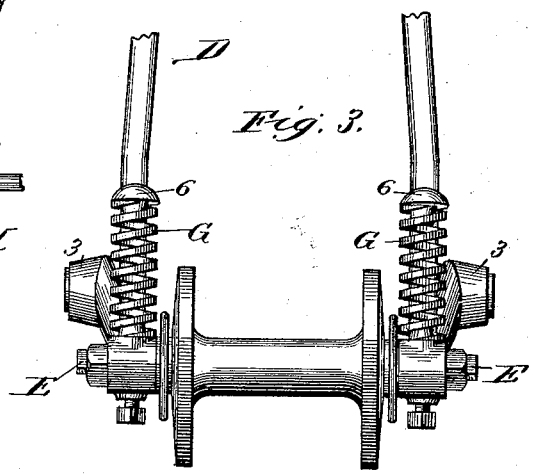
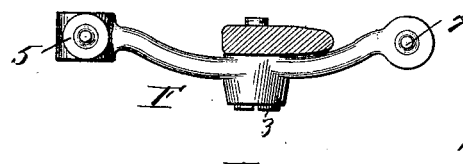
Witnesses
W. Rossiter
Fred'k H. Mills
Inventor
William J. Edwards
By Chas. G. Page
Atty.

UNITED STATES PATENT OFFICE.

WILLIAM J. EDWARDS, OF CHICAGO, ILLINOIS, ASSIGNOR TO THE UNION MANUFACTURING AND PLATING COMPANY, OF SAME PLACE.

VELOCIPEDE.

SPECIFICATION forming part of Letters Patent No. 475,207, dated May 17, 1892.

Application filed March 10, 1891. Serial No. 384,436. (No model.)

*To all whom it may concern:*

Be it known that I, WILLIAM J. EDWARDS, a citizen of the United States, residing at Chicago, in the county of Cook and State of Illinois, have invented a certain new and useful Improvement in Velocipedes, of which the following is a specification.

My invention relates more particularly to velocipedes of the kind known as "Safety bicycles," but may be applied to tricycles, tandems, and the like.

The objects of my invention are to effectively relieve the arms and person or body of the rider from jolts and concussions while running the machine over uneven places along the road and to provide certain novel and improved details of construction serving to increase the general efficiency of velocipedes.

To the attainment of the foregoing and other useful ends my invention consists in matters hereinafter set forth.

In the accompanying drawings, Figure 1 represents in side elevation a Safety bicycle with a spring-balance device embodying my invention applied between the steering-fork and front axle. Fig. 2 is a side elevation of the spring-balance device of Fig. 1 on a somewhat larger scale, one of the springs being shown in section. Fig. 3 is a front elevation of Fig. 2. Fig. 4 is a sectional plan on line 4 4 in Fig. 2. Fig. 5 represents the axle.

In said drawings, A indicates the reach or backbone; B, the front steering-wheel, and C the rear driving-wheel of a Safety bicycle. The steering-fork D supports the forward end of the reach from the front wheel and straddles the latter, so that it may extend down to and connect with means herein provided for supporting it upon the axle E of said wheel. As a connecting-support between the front axle E and the steering-fork, I key or otherwise rigidly secure upon each end of said axle an arm F, which is at its forward end fixed upon the axle and arranged to extend back from the same. While I may fix these arms upon the axle in various ways, I prefer to provide the axle with polygonal end portions 1, Fig. 5, and engage such end portions in similarly-shaped bearings in the arms. By such arrangement the arms can be readily applied and also be held rigid upon the axle in a simple and durable way. The lower end portions 2 of the two divisions of the steering-fork are pivotally connected with the arms F by means of pivots 3 at points back of the front axle and between the front and rear ends of the arms, in which way pivotal connection between the front axle and steering-fork is made somewhat back of the axle.

In connection with the steering-fork and axle-arms I provide two sets or pairs of balance-springs G and H. The balance-springs G are arranged between the steering-fork and arms F, forward of the pivotal connections between said members. In order to retain springs G in place as spring-cushions between the fork and arms or axle, as aforesaid, the lower end portions of the fork are extended forward so as to provide it with arms 4, which extend over the front axle, and by such arrangement the springs G can, as herein shown, be arranged between seats 5 on the forward ends of the arms F and seats 6 on the forward ends of the steering-fork ends or arms 4.

As a means for retaining the springs H in place as elastic cushions between the fork and axle-arms, the rear ends of the arms are provided with seats 7, and the divisions or prongs of the forks are at points back of their pivotal connections with the arms provided with seats 8, in which way the springs H may, as shown, be confined between said seats. The springs are normally compressed to such extent that when a relative rocking action between the fork and axle-arm occurs the compression of one pair of springs either forward or in the rear of the pivotal connections between the axle-arms and steering-fork (as the case may be) will be attended by a proportional extent of yield or expansion on the part of the other pair of springs. Each spring is practically arranged between a pair of jaws, it being observed that by the construction and arrangement herein involved I provide four pairs of such jaws, which are all so connected that they must have a synchronous operation. Thus the two forwardly-arranged pairs of jaws are formed by the forward ends of the arms F, which are rigid with the axle, and the forwardly-extending lower end portions 4 of the steering-fork prongs, while on the other hand the rearwardly-arranged jaws—that is to say, the jaws in rear of pivots 3—are formed by the rear ends of the arms F and portions of the steering-fork prongs in rear of said pivots. The upper jaws are therefore formed by portions of the steering-fork prongs arranged, respectively, forward of and in rear of the joints or pivots, by which the steering-fork is pivotally supported upon a pair of arms which are rigid with and arranged to extend back from the axle. The springs are also arranged to maintain a normal balance in the relative position of the fork and arms and may be said to maintain the four pairs of jaws normally open. By such arrangement all possibility of shock or objectionable jar on the arms of the rider is avoided, since a relative rocking action between the steering-fork and arms in both directions will be met by a spring-resistance which at all times tends to maintain a normally-balanced condition between said two members.

By rigidly keying the arms F upon the polygonal ends of the front axle the latter may be said to constitute a rock-shaft provided with a couple of arms which are rigid with it and arranged, respectively, at opposite sides of the front wheel. These arms are pivotally connected with the steering-fork, so as to form rocking connections; but since each arm is rigid with the axle there can of course be no movement of one arm independent of the other arm. Each pair of springs, being normally compressed, is therefore in effect normally under tension, and thus, as a means for preserving what may be termed a "balance" or "normal relative condition" between the arms and the fork, I secure the combined effect of springs arranged to oppose the relative vibratory or rocking movement between the arms and fork in both directions. When, for example, the fork is suddenly depressed or the front wheel is caused to suddenly rise by reason of its running over an abrupt obstruction in the road, the relative rocking action between the arms and the fork will be in a direction to synchronously compress the forwardly-arranged springs G, and simultaneously therewith the springs H will expand and in so doing will assist the arms F in their action and aid in securing a steady or perfect unity of movement on the part of the arms. The reaction or reverse action incident to the foregoing-described act or movement will allow the forward springs G to expand and assist in restoring the parts to their properly-balanced condition, while at the same time the rear springs H will be momentarily compressed in excess of their normally-compressed condition, and hence such rear springs will take up the shock and then expand until they attain their normal state of compression.

While I prefer as a connection between the steering-fork and front axle the construction herein specifically illustrated, I may provide the steering-fork with arms on opposite sides of the pivot of the wheel carrying arms F and interpose the springs G and H, respectively, on opposite sides of the arms F, or I may provide these arms F with projections on either side of the fork and arrange the springs in substantially the same manner.

It will be observed that it is characteristic of the spring-balance device herein shown and described that it has an arm rigid with an axle of the velocipede and pivotally connected with the reach or body-frame, so as to form between the two a rocking jointed connection, and a spring resistance or spring-balance arranged in opposition to a relative rocking movement in both directions between the pivotally-connected members and tending when compressed or placed under more than ordinary tension in opposition to a relative rocking action between the arm and body-frame to restore the rocking jointed connection to its normal position or condition, and also that a rocking jointed connection of such character and the spring resistance or balance to which it is subject is arranged at each side of the wheel.

What I claim as my invention is—

1. The combination, substantially as hereinbefore set forth, in a velocipede, of an arm rigid with an axle and pivotally connected with the body-frame, and a couple of springs interposed between the body-frame and said arm, respectively, at opposite sides of the pivotal connection between the arm and body-frame, substantially as set forth.

2. The combination, substantially as hereinbefore set forth, in a velocipede, of a couple of arms rigid with an axle and pivotally connected with the body-frame, so as to form between the two a couple of rocking jointed connections, respectively, at opposite sides of the wheel, and springs arranged, respectively, at opposite sides of the pivotal connection between the arm and the frame to oppose the rocking movements of said jointed connections, substantially as set forth.

3. The combination, substantially as hereinbefore set forth, with the front axle in a velocipede, of an arm rigid with said axle and pivoted to the steering-fork, so as to provide in effect a rocking connection between the front axle and the reach or body-frame, and a couple of balance springs located between the arm and fork on opposite sides of the pivot, arranged to oppose a relative rocking action between said arm and steering-fork, substantially as set forth.

4. The combination, substantially as hereinbefore set forth, with the front axle in a velocipede, of a couple of arms rigid with the axle and pivotally connected with the prongs of the steering-fork, springs arranged between the axle and forwardly-projecting portions of the steering-fork prongs at points forward of the pivotal connections between the arms and prongs, and springs arranged between said arms and prongs at points back of the pivotal connections between the arms and steering-fork prongs, substantially as set forth.

5. The combination, substantially as hereinbefore set forth, in a velocipede, of the steering-fork having its prongs provided with forwardly-extending arms 4, arms F, fixed upon the front axle and pivoted between their ends to the steering-fork prongs, and springs G and H, arranged substantially as described, to oppose a relative rocking action between the steering-fork and said arms.

WILLIAM J. EDWARDS.

Witnesses:
CHAS. G. PAGE,
FREDK. H. MILLS.